UNITED STATES PATENT OFFICE 2,476,860

PROCESS FOR PREPARING ENOL ESTERS OF ENOLIZABLE ORGANIC COMPOUNDS

Hugh J. Hagemeyer, Jr., Kingsport, Tenn., assignor to Eastman Kodak Company, Rochester, N. Y., a corporation of New Jersey No Drawing. Application May 6, 1948, Serial No. 25,526

10 Claims. (Cl. 260—488)

This invention relates to a process for the preparation of unsaturated carboxylic esters.

It is known that ketene ($CH_2=C=O$) and substituted ketenes will react with certain aldehydes and ketones, in the presence of an acid catalyst, to give unsaturated carboxylic esters. For example, ketene can be reacted with ketones, in the presence of hydrochloric, phosphoric or sulfuric acids, to produce isoalkenyl acetates of the type of isopropenyl acetate. See U. S. Patent 2,383,965 to Gwynn and Degering, dated September 4, 1945. Likewise, it is known that ketene can be reacted with ketoesters and diketones, in the presence of an acid catalyst containing the group —$SO_2OH$ (e. g. sulfuric acid, a halogenosulfonic acid such as chlorosulfonic acid, an alkylsulfuric acid such as methylsulfuric acid or a sulfamic acid such as sulfaminic acid) to produce enol acetates of these compounds, of which ethylacetoacetate and acetylacetone are typical. See U. S Patents. 2,407,301 and 2,407,302 to Spence and Degering, dated September 10, 1946. Unsaturated carboxylic esters have also been prepared by reacting ketene with aldehydes and ketones in the presence of still other acid catalysts such as p-toluenesulfonic acid, sulfoacetic acid

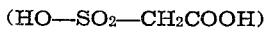
(HO—$SO_2$—$CH_2COOH$)

or addition compounds formed in situ such as the sulfoacetic acid—acid addition product

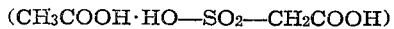
($CH_3COOH \cdot HO$—$SO_2$—$CH_2COOH$)

While the above-mentioned processes are capable of providing various useful unsaturated carboxylic esters, the yields are low and considerable polymerization of the ketene and the unsaturated carboxylic ester products occurs in the reactions.

I have now found that by employing complex acid catalysts of the acyl sulfocarboxylic acid or phosphoryl sulfate type in the reaction of ketene or substituted ketenes with enolizable organic compounds such as aldehydes and ketones, the yields of the desired unsaturated carboxylic esters are markedly increased and objectionable polymerization products are reduced. I have found further that the use of these complex acid catalysts, particularly the reaction products of sulfuric acid and the lower aliphatic carboxylic acids containing from 1 to 4 carbon atoms and/or their anhydrides, which can be represented by the general formula:

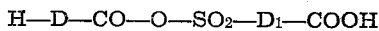
H—D—CO—O—$SO_2$—$D_1$—COOH wherein D and $D_1$ represent divalent aliphatic saturated hydrocarbon groups (i. e. alkylene groups) of the same number of carbon atoms selected from those containing from 1 to 3 carbon atoms such as, for example, acetyl sulfoacetic acid, propionyl sulfopropionic acid or butyryl sulfobutyric acid, is generally applicable to the acylation of any enolizable organic compound.

It is, accordingly, an object of the invention to provide an improved process for preparing unsaturated carboxylic esters. Other objects will become apparent hereinafter.

In accordance with the invention, the unsaturated carboxylic esters are prepared by passing ketene or a substituted ketene into a solution of the complex acid catalyst in an enolizable organic compound. The enolizable compound may be diluted with an inert solvent such as diisopropyl ether, carbon tetrachloride, carbon disulfide, ethylene dichloride, etc., and reaction conducted in this diluted medium. The halogenated hydrocarbon compounds are preferred as diluents because the ketene monomers remain stable for longer periods in this kind of reaction medium. The ketene is ordinarily passed into the reaction solution over a period of 1 to 6 hours. At the end of this time, the mixture is fractionated to recover the unsaturated carboxylic esters. The temperature of the reaction can be varied from 20° to 90° C. The concentration of the catalyst can be varied from 0.1 to 3.0 per cent by weight of the reactants. Higher catalysts concentrations may be used, but no further advantage would result therefrom. The reaction may be carried out at reduced, normal or increased pressures, either batchwise or in continuous manner. The ratio of the reactants can be varied widely, but preferably 1 molecular proportion of the ketene is reacted with from 1 to 3 molecular proportions of the aldehyde or ketone. Polymerization inhibitors such as copper acetate, hydroquinone, etc., can advantageously be employed in the reaction mixture. Advantageously the catalyst can be neutralized by the addition to the reaction mixture of a neutralizing reagent such as sodium acetate, sodium bicarbonate, sodium hydroxide or similar compounds prior to separation of the acylated enol product as by distillation.

Ketene or substituted ketenes (aldoketenes and ketoketenes) can be employed in practicing the invention, e. g. simple ketene ($CH_2=C=O$), methylketene, dimethylketene, diethyl ketene, diphenylketene, etc. All of these substances are included under the term "a ketene." The simplest ketene ($CH_2=C=O$) is especially efficacious, we have found. It can be prepared conveniently by the pyrolysis of acetone, removing the small quantity of residual acetone by passing the resulting vapors through a series of cold traps before utilizing the ketene for reaction with the enolizable organic carbonyl compounds. Ketene prepared by the pyrolysis of acetic acid can also be used.

Exemplary of enolizable organic compounds which may be employed in the process of the invention are aldehydes which contain at least two carbon atoms and at least on hydrogen atom on the carbon atom adjacent to the carbonyl group. The aldehydes containing at least two hydrogen atoms on the carbon atom adjacent to the aldehyde group are especially useful in practicing the invention. Aldehydes which contain a system of conjugated bonds in which the double bond of the aldehyde group is part such as, for example, crotonaldehyde, 2-ethacrolein and 2-ethyl-2-hexenal are also adaptable to the process of the invention. Acrolein and 2-methacrolein cannot be employed in my process. Polymeric forms of the aldehydes can be employed. Other enolizable organic compounds which may also be employed are ketones containing at least one hydrogen atom on a carbon atom adjacent to the carbonyl group, diketones containing at least one hydrogen atom on a carbon atom adjacent to a carbonyl group, and ketocarboxylic esters containing at least one hydrogen atom on the carbon atom adjacent to the keto carbonyl group. The ketones and diketones containing at least two hydrogen atoms on the carbon atom adjacent to the carbonyl group, and the ketocarboxylic esters containing at least two hydrogen atoms on the carbon atom adjacent to the keto carbonyl group are especially useful in practicing the invention.

Specifically, the enolizable organic compounds which may be employed in the practice of the invention include aldehydes such as acetaldehyde, propionaldehyde, n-butyraldehyde, isobutyraldehyde, n-valeraldehyde, iso-valeraldehyde, 2-ethylbutyraldehyde, phenylacetaldehyde, phenylpropaldehyde, crotonaldehyde, ketones such as acetone, methyl ethyl ketone, diethyl ketone, methyl isobutyl ketone, methyl amyl ketone, methyl hexyl ketone, diisobutyl ketone, methyl vinyl ketone, methyl isopropenyl ketone, cyclohexanone, cyclopentanone, cyclobutanone, acetophenone, mesityl oxide, methyl butyl ketone, phenyl propyl ketone, methylbenzyl ketone, methyl furfuryl ketone, difurfuryl ketone, ketocarboxylic esters such as ethyl pyruvate, ethyl propionylformate, ethyl n-butyrylformate, ethyl isovalerylformate, methyl acetoacetate, benzyl acetoacetate, methyl α-acetylpropionate, ethyl α-acethyl-propionate, ethyl propionoacetate, methyl n-butyroacetate, phenyl acetoacetate, ethyl decanoylacetate, methyl levulinate, ethyl levulinate, ethyl-δ-(n-butyryl)-n-butyrate, diketones such as biacetyl (2,3-butanedione), acetylpropionyl, acetylisobutyryl, bipropionyl, bi-n-butyryl, acetylcaproyl, acetylacetone (2,4-pentanedione), 2,4-hexanedione, 2,4-heptanedione, 5-methyl-2,4-hexanedione, benzoylacetone, benzoylethyl methyl ketone, benzoyl-n-butyl methyl ketone, benzoyl-iso-butyl methyl ketone, 1-phenyl-2,4-pentanedione, 3-methyl-2,4-pentanedione, 2,5-hexanedione, 6-methyl-2,5-heptanedione, 3,6-octanedione, 4-benzoyl-2-butanone, 2,6-heptanedione, 1,3-cyclohexanedione, etc.

The complex acid catalysts employed in the process of the invention may be prepared by the reaction of sulfuric acid on a carboxylic acid or its anhydride. For example, when sulfuric acid and acetic anhydride are mixed in proper proportions, there is obtained acetyl sulfoacetic acid which has the following structural formula:

CH₃CO—O—SO₂—CH₂—COOH

More specifically, this acid catalyst can be prepared in several ways (1) by reacting two gram-moles of acetic anhydride with one gram-mole of sulfuric acid, (2) by reacting two gram-moles of acetic anhydride with one gram-mole of sulfur trioxide and (3) by reacting two gram-moles of ketene with one gram-mole of sulfuric acid. When an aliphatic acid is formed as a by-product, as in above methods (1) and (2), the aliphatic acid is preferably first removed by distillation before use of the catalyst. While more than two gram-moles of acetic anhydride or of ketene can be employed for each mole of sulfuric acid or sulfur trioxide, the ratio of two gram-moles of acetic anhydride or ketene to one gram-mole of sulfuric acid or sulfur trioxide is preferred. The catalysts of the present invention are not to be confused with sulfoacetic acid (HO—SO₂—CH₂COOH) or with sulfoacetic acid-acid addition products (CH₃COOH·HO—SO₂—CH₂COOH)

which function principally as condensation catalysts. Prior art investigators have postulated the formation of these latter compounds in situ. However, these catalysts, whether prepared in situ or independently, do not compare favorably as to yield and as to freedom from objectionable polymeric by-products with the complex acid catalysts of the present invention. Acetylsulfoacetic acid is particularly efficacious.

The following examples will serve to illustrate further the manner of practicing the invention.

*Example 1.—Isopropenyl acetate*

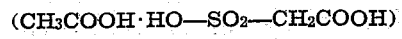

A quantity of acetyl sulfoacetic acid was prepared by reacting 40 cc. of concentrated sulfuric acid with 144 grams of acetic anhydride for 30 minutes at 80° C. The acetic acid formed as a by-product was removed by distillation of the reaction mixture at 50 mm. pressure to leave a residue essentially pure acetyl sulfoacetic acid.

Six drops of the above catalyst were added to 300 cc. of acetone and the solution brought to gentle reflux. Two gram-moles of ketene (CH₂=C=O) were then passed into the acetone-acetyl sulfoacetic acid mixture through a hollow high speed stirrer, which also serves to agitate the mixture, at the rate of 0.47 gram-mole of ketene per hour. The mixture was then distilled at atmospheric pressure and 141.6 grams of isopropenyl acetate boiling at 96° C. were obtained. The isopropenyl acetate had a refractive index (20/D) of 1.4001. This yield represented a 71 per cent conversion of the ketene to isopropenyl acetate.

In place of acetyl sulfoacetic acid in the above example, there was substituted six drops of concentrated sulfuric acid. The yield of isopropenyl acetate was 85 grams equivalent to only 42 per cent conversion of the acetone to isopropenyl acetate.

*Example 2.—Cyclohexenyl acetate*

Two gram-moles of ketene (CH₂=C=O) were passed through a hollow stirrer into a solution of 300 cc. of cyclohexanone containing six drops of acetyl sulfoacetic acid and at a temperature of 70°–74° C., at the rate of 0.5 gram-mole of ketene per hour. The mixture was then distilled at reduced pressure and 214 grams of cyclohexenyl acetate boiling at 99°–100° C. at 50 mm. pressure were obtained. The yield represented a 77 per cent conversion of the ketene to cyclohexenyl acetate.

*Example 3.—2-acetoxy butadiene-1,3*

Two gram-moles of ketene ($CH_2=C=O$) were passed through a hollow stirrer into a solution of 200 grams of methyl vinyl ketone containing six drops of acetyl sulfoacetic acid and 0.5 gram of copper acetate, at the rate of 0.5 to 1.0 gram-mole per hour. The catalyst was then neutralized with sodium acetate. The mixture was distilled at reduced pressure and 2-acetoxy butadiene-1,3 boiling 54° C. at 40 mm. pressure was obtained. The 2-acetoxy butadiene-1,3 had a a refractive index (20/D) of 1.4420.

*Example 4.—3-acetoxy isoprene*

Two gram-moles of ketene ($CH_2=C=O$) were passed through a hollow stirrer into a solution of 200 grams of methyl isopropenyl ketone containing six drops of acetyl sulfoacetic acid and 0.5 gram of copper acetate at the rate of 0.6 gram-mole of ketone per hour. The catalyst was then neutralized with sodium acetate. The mixture was distilled at reduced pressure, and 3-acetoxy isoprene boiling at 62° C. at 40 mm. pressure was obtained. The 3-acetoxy isoprene had a refractive index (20/D) of 1.4450.

*Example 5.—Alpha-acetoxy styrene*

Two gram-moles of ketene ($CH_2=C=O$) were passed through a hollow stirrer into a solution of 300 grams of acetophenone containing 0.5 gram of propionyl sulfopropionic acid, and at a temperature of 65° C., at the rate of 0.5 gram-mole of ketene per hour. The mixture was then distilled at reduced pressure and 205 grams of alpha-acetoxy styrene boiling at 85° C. at 2 mm. pressure were obtained. The yield represented a 63 per cent conversion of the ketene to alpha-acetoxy styrene.

*Example 6.—Normal butenyl acetate*

300 cc. of n-butyraldehyde and 0.5 gram of acetyl sulfoacetic acid were heated at 56°–60° C. while passing into the mixture two gram-moles of ketene ($CH_2=C=O$) through a hollow high speed stirrer, which also serves to agitate the mixture, at a rate of 0.5 gram-mole of ketene per hour. The acetyl sulfoacetic acid was neutralized with solid sodium bicarbonate after all the ketene was introduced. The neutralized reaction mixture was subjected to distillation and 63 grams of n-butenyl acetate boiling 128° C. at 735 mm. pressure were obtained. This yield repreesnted a 28 per cent conversion of the ketene to n-butenyl acetate.

*Example 7.—Enol acetates of acetoacetic ester*

Two gram-moles of ketene ($CH_2=C=O$) were passed into a solution 250 cc. of ethyl acetoacetate containing 0.6 gram of acetyl sulfoacetic acid over a period of reaction of two hours. The enol acetates of acetoacetic ester were then distilled from the mixture at 94° C. at 10 mm. pressure. The yield of enol acetates was 92 per cent based on the amount of ethyl acetoacetate employed.

*Example 8.—Enol acetates of acetyl acetone*

100 grams of acetyl acetone, 200 cc. of carbon tetrachloride and 0.6 gram of acetyl sulfoacetic acid were mixed together and 2 gram-moles of ketene ($CH_2=C=O$) were passed into the mixture maintained at 60° C.–65° C., at the rate of 0.5 gram-mole of ketene per hour. Upon distillation of the reaction mixture there were obtained 60 grams of the mono enol acetate boiling at 84° C. at 10 mm. pressure and 27 grams of the di enol acetate boiling at 114° C. at 10 mm. pressure. These yields correspond to 42 per cent conversion of the acetyl acetone to the mono enol acetate and 15 per cent conversion of the acetyl acetone to the di enol acetate.

*Example 9.—1-acetoxy butadiene-1,3*

Two moles of ketene ($CH_2=C=O$) were passed through a hollow stirrer into a solution of 150 cc. of crotonaldehyde and 150 cc. of ethylene dichloride containing 0.2 gram of copper acetate and 0.6 gram of acetyl sulfoacetic acid, at a temperature of 55°–60° C., at the rate of 0.5 mole of ketene per hour. The catalyst was then neutralized with sodium bicarbonate. Upon distillation of the mixture at reduced pressure there was obtained 1-acetoxy butadiene-1,3 boiling at 58° C. at 40 mm. pressure.

What I claim is:

1. A process for preparing an unsaturated carboxylic ester comprising reacting, in the presence of an acid catalyst selected from those having the general formula:

$$H-D-CO-O-SO_2-D_1-COOH$$

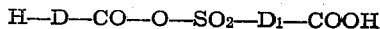

wherein D and $D_1$ represent divalent saturated aliphatic hydrocarbon groups of the same number of carbon atoms selected from those containing from 1 to 3 carbon atoms, a ketene with an enolizable organic compound selected from the group consisting of aldehydes containing at least two carbon atoms and no carbon to carbon double bond conjugated with the double bond of the carbonyl group, and containing at least one enolizable hydrogen atom on the carbon atom adjacent to the carbonyl group, and aldehydes containing a carbon to carbon double bond conjugated with the double bond of the carbonyl group and containing at least one enolizable hydrogen atom on the carbon atom adjacent to one of the carbon atoms of the carbon to carbon double bond, ketones containing at least one hydrogen atom on a carbon atom adjacent to the carbonyl group, diketones containing at least one hydrogen atom on a carbon atom adjacent to a carbonyl group, and ketocarboxylic esters containing at least one hydrogen atom on the carbon atom adjacent to the keto carbonyl group.

2. A process for preparing an unsaturated carboxylic ester comprising reacting, in the presence of an acid catalyst selected from those having the general formula:

$$H-D-CO-O-SO_2-D_1-COOH$$

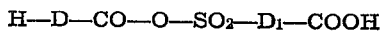

wherein D and $D_1$ represent divalent saturated aliphatic hydrocarbon groups of the same number of carbon atoms selected from those containing from 1 to 3 carbon atoms, ketene ($CH_2=C=O$) with an aldehyde which contains at least two carbon atoms and which contains at least one hydrogen atom on the carbon atom adjacent to the carbonyl group.

3. A process for preparing an unsaturated carboxylic ester comprising reacting, in the presence of an acid catalyst selected from those having the general formula:

$$H-D-CO-O-SO_2-D_1-COOH$$

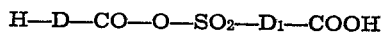

wherein D and $D_1$ represent divalent saturated aliphatic hydrocarbon groups of the same number of carbon atoms selected from those containing from 1 to 3 carbon atoms, ketene ($CH_2=C=O$)

with a ketone which contains at least one hydrogen atom on a carbon atom adjacent to the carbonyl group.

4. A process for preparing an unsaturated carboxylic ester comprising reacting, in the presence of an acid catalyst selected from those having the general formula:

H—D—CO—O—SO$_2$—D$_1$—COOH wherein D and D$_1$ represent divalent saturated aliphatic hydrocarbon groups of the same number of carbon atoms selected from those containing from 1 to 3 carbon atoms, ketene (CH$_2$=C=O) with a diketone which contains at least one hydrogen atom on a carbon atom adjacent to a carbonyl group.

5. A process for preparing an unsaturated carboxylic ester comprising reacting, in the presence of an acid catalyst selected from those having the general formula:

H—D—CO—O—SO$_2$—D$_1$—COOH wherein D and D$_1$ represent divalent saturated aliphatic hydrocarbon groups of the same number of carbon atoms selected from those containing from 1 to 3 carbon atoms, ketene (CH$_2$=C=O) with an aldehyde which contains at least two carbon atoms and which contains at least two hydrogen atoms on the carbon atom adjacent to the carbonyl group.

6. A process for preparing an unsaturated carboxylic ester comprising reacting, in the presence of an acid catalyst selected from those having the general formula:

H—D—CO—O—SO$_2$—D$_1$—COOH wherein D and D$_1$ represent divalent saturated aliphatic hydrocarbon groups of the same number of carbon atoms selected from those containing from 1 to 3 carbon atoms, ketene (CH$_2$=C=O) with a ketone which contains at least two hydrogen atoms on the carbon atoms adjacent to the carbonyl group.

7. A process for preparing an unsaturated carboxylic ester comprising reacting, in the presence of an acid catalyst selected from those having the general formula:

H—D—CO—O—SO$_2$—D$_1$—COOH wherein D and D$_1$ represent divalent saturated aliphatic hydrocarbon groups of the same number of carbon atoms selected from those containing from 1 to 3 carbon atoms, ketene (CH$_2$=C=O) with a diketone which contains at least two hydrogen atoms on the carbon atom adjacent to the carbonyl group.

8. A process of preparing 1-buten-1-ol acetate comprising reacting, in the presence of acetyl sulfoacetic acid, ketene (CH$_2$=C=O) with n-butyraldehyde.

9. A process for preparing isopropenyl acetate comprising reacting, in the presence of acetyl sulfoacetic acid, ketene (CH$_2$=C=O) with acetone.

10. A process for preparing 1-acetoxy butadiene-1,3 comprising reacting, in the presence of acetyl sulfoacetic acid, ketene (CH$_2$=C=O) with crotonaldehyde.

HUGH J. HAGEMEYER, Jr.

No references cited.